Figure 1:
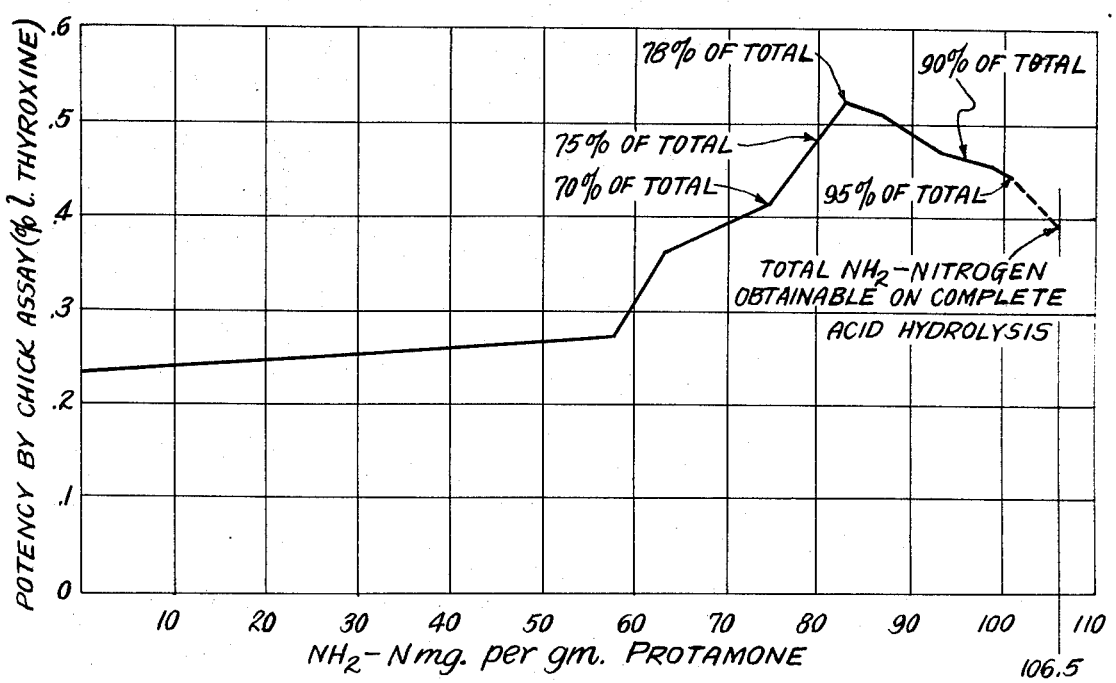

United States Patent

Hoover et al.

[15] 3,674,770

[45] July 4, 1972

[54] HIGH POTENCY THYROIDALLY ACTIVE MATERIALS PREPARED BY PARTIAL ACID HYDROLYSIS OF IODINATED PROTEIN

[72] Inventors: Richard D. Hoover, Lee's Summit, Mo.; George O. Kohler, El Cerrito, Calif.

[73] Assignee: Agri-Tech, Inc., Kansas City, Mo.

[22] Filed: March 24, 1971

[21] Appl. No.: 127,789

Related U.S. Application Data

[63] Continuation-in-part of Ser. No. 584,119, Oct. 4, 1966, abandoned.

[52] U.S. Cl. ..................................260/119, 99/2 R, 99/4, 99/10, 99/17, 99/18, 99/21, 260/112 T, 260/123.5
[51] Int. Cl. ..................A61k 17/10, C07g 7/00, C07g 15/00
[58] Field of Search........................................260/112 T, 119

[56] References Cited

UNITED STATES PATENTS 3,455,894  7/1969  Hoover et al. ..........................260/119

FOREIGN PATENTS OR APPLICATIONS 598,679  2/1948  Great Britain..........................260/112

OTHER PUBLICATIONS

J. of Biological Chemistry, vol. 149, 1943, pp. 563–570, Reineke et al.
J. of Biological Chemistry, vol. 238, 1963, pp. 1343–1347, Koshland et al.

*Primary Examiner*—Howard E. Schain

[57] ABSTRACT

A process for obtaining thyroidally active material of increased biological activity wherein thyroactive iodinated protein is subjected to partial hydrolysis with acid until about 70 to 95% of the $NH_2$-nitrogen obtainable on complete acid hydrolysis is liberated.

8 Claims, 2 Drawing Figures

INVENTORS
GEORGE O. KOHLER
BY RICHARD D. HOOVER

Bacon & Thomas
ATTORNEYS

HIGH POTENCY THYROIDALLY ACTIVE MATERIALS PREPARED BY PARTIAL ACID HYDROLYSIS OF IODINATED PROTEIN

This application is a continuation-in-part of parent application, Ser. No. 584,119 filed Oct. 4, 1966 now abandoned.

The present invention relates to improvements in a synthetic thyroprotein composition and more particularly to a very efficient method for producing increased potency compositions by liberating thyroxine from iodinated tyrosine-containing protein involving a treatment of the iodinated protein with acid under special conditions.

It has been well known heretofore that many proteins can be reacted with iodine under suitable conditions to form a product which has biological activity resembling that of dried thyroid tissue when administered to livestock or poultry or when used in human therapy. In the case of thyroid gland material, the active principle, the amino acid thyroxine, is already essentially completely biologically available, although it is a component part of the protein. In the case of the synthetic iodinated proteins, the tyrosine is believed to be partly or completely converted to thyroxine, bound as a component part of the starting protein in such a manner as to be biologically relatively unavailable. Commercial thyroactive iodinated protein contains about 1% l. thyroxine, but by the thiouracilized chick bioassay, only one quarter of the thyroxine is available.

While some thyroxine can be isolated after either acid or barium hydroxide treatment of thyroactive iodinated protein, it does not follow that thyroxine per se exists in the protein in simple peptide form. Rather, recent work by ourselves and others strongly indicates that the thyroxine which appears during treatment with either acid or base is formed from a complex precursor bound in the protein by peptide linkages.

Johnson and Towksbury, Proc. Nat'l. Acad. Sci. 28:73 (1942) have postulated a structure for this precursor and the liberation of thyroxine therefrom may be represented as follows:

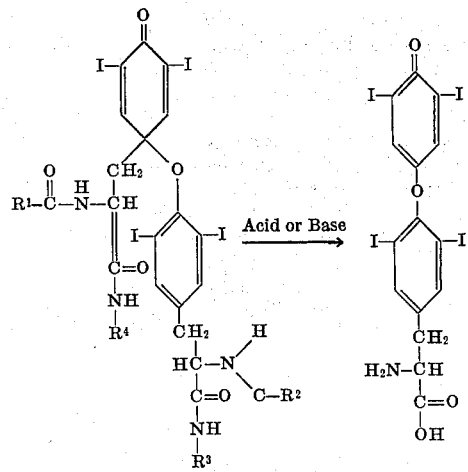

Precursor → Thyroxine + by products where $R^1$, $R^2$, $R^3$ and $R^4$ represent the linking of the precursor to the parent protein molecule.

The evidence supporting this reaction mechanism is: (1) the decreased susceptibility of thyroactive iodinated protein treated with oxygen to the action of tryptic enzymes as compared to the original protein as would be expected if an unusual type of crosslinking had taken place; (2) the biological activity of thyroactive iodinated protein is proportionately much less than would be expected on the basis of the amount of thyroxine obtainable from acid or alkali treated products. This effect might be partly due to decreased digestibility of the synthetic thyroactive iodinated proteins as compared with acid or base treated materials but is also in accord with the idea that the precursor per se is not highly active and that conversion of precursor to thyroxine does not occur rapidly enough within the digestive tract to permit efficient thyroxine absorption; (3) acids or alkalis have a different effect on biological activity of artificially iodinated proteins than on hydrolysis of desiccated thyroid a naturally occurring iodinated protein where the thyroxine is present either as such, or as a different type of precursor; in either case bound in peptide form and (4) lastly, the amount of thyroxine obtainable on complete barium hydroxide or acid treatment is a function of reaction conditions. This point is the strongest evidence for validity of the above mechanism and also is the basis of the present invention and of the invention in our copending application, Ser. No. 540,828, filed Apr. 7, 1966, now U.S. Pat. No. 3,455,894.

The art has been aware of three different chemical procedures for liberating thyroxine from synthetic thyroprotein as discussed above, but all suffer from disadvantages. With proteolytic enzymes, poor yields result and if an inorganic alkali, such as barium hydroxide is utilized, the thyroxine is racemized and is recovered as a dextro-levo-rotatary mixture. Since only the levo-rotatary isomer has biological activity, one-half of the d.l. thyroxine (racemic) is not biologically available. Though thyroxine, like many other amino acids is obtained in the natural levo-rotatary form by normal acid treatment, attempts to recover good yields of l. thyroxine after complete acid hydrolysis were unsuccessful and the process was thought to have little value.

It was recognized by the prior art (e.g., British Pat. No. 598,679 and Reineke et al., The Journal of Biological Chemistry, Vol. 149 (1943), pages 563–570) that the destruction of thyroxine occurs during acid hydrolysis. It was suggested that the problem might be solved by carrying out hydrolysis in the presence of butyl alcohol so that the product will be extracted into the alcohol as produced. The present invention enables one to carry out the process without the necessity of using butyl alcohol from which the product must then be recovered. It also provides a means for obtaining maximum thyroxine activity by chick assay with relatively short reaction times.

We have now verified that in the acid treatment of synthetic thyroactive iodinated protein, the formation of thyroxine from precursor proceeds simultaneously with the destruction of thyroxine by the acid. However, we have discovered that the rate of thyroxine formation up to a certain stage of hydrolysis is greater than the rate of destruction and that after this stage thyroxine is destroyed faster than it is being formed so that a sharp maximum in biological activity occurs during the course of treatment with acid. This maximum may be predicted from the percentage of free amino nitrogen ($NH_2$—N) in the reaction mixture with respect to total free amino nitrogen ($NH_2$—N) obtainable on complete acid hydrolysis. It can be seen from FIG. 1, which is a graph of potency by chick assay in percent l. thyroxine as ordinate plotted against free amino nitrogen ($NH_2$—N) as abscissa that the greatest improvement in biological activity over the untreated protein is observed when 75–90% of the $NH_2$ — nitrogen obtainable on complete acid hydrolysis has been reached. Marked improvement over untreated protein and over completely hydrolyzed protein is obtained when the hydrolysis is stopped in the range of from about 70 to 95 percent of the total obtainable $NH_2$— nitrogen. On the example of the graph the potency increased to a point corresponding to about 83 mg/gm of $NH_2$—N (78 percent of total) and then progressively declined due to destruction of thyroxine.

Figure 2:
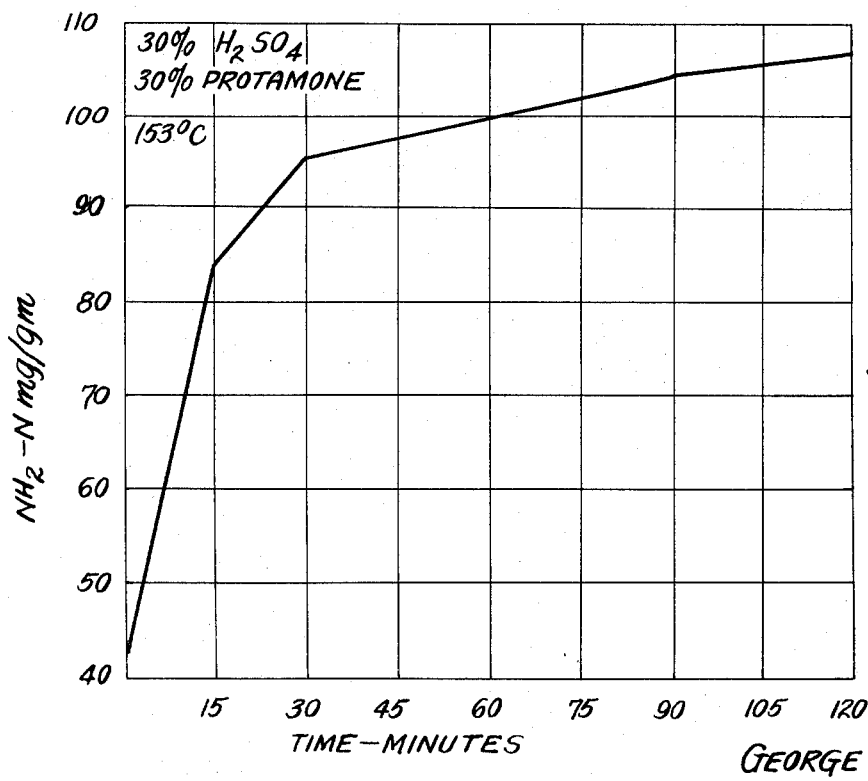

From FIG. 2, which is a graph of free amino nitrogen ($NH_2$—N) vs. time for a particular 30% $H_2SO_4$—30 percent Protamone sample at 153° C., it can be seen that the free amino nitrogen ($NH_2$—N) content is steadily increasing even over the range wherein the thyroxine content is decreasing. Furthermore, treating beyond the optimum point results in declining potency and, of course, increases cost of treatment per unit of potency to a marked degree. Thus, the recovery of thyroxine is not a simple matter of hydrolyzing the protein to free amino nitrogen ($NH_2$—N), but a complex reaction, the optimum conditions being heretofore unpredictable.

The term amino nitrogen ($NH_2$—N) is used to indicate the free amino acid —$NH_2$ groups. The amount of amino nitrogen present at any stage can be determined by conventional chemical analyses, e.g., determination of liberated carboxyl due to reaction of amino groups with formaldehyde as by the Sorensen titration, Van Slyke amino nitrogen titration determination, etc. This figure is directly related to the amount of free amino acid $NH_2$ groups present, but not necessarily to the total amount of nitrogen present in the mixture. The total amount of potential amino acid —$NH_2$ present in the iodinated protein is determined by continuing acid treatment until a maximum figure is obtained. This figure is 106.5 mg. of amino acid nitrogen ($NH_2$—N) per gram of thyroactive iodinated protein for the example shown in the graphs. Thus, to compute the extent of reaction all that is required is to divide the figure for $NH_2$—N obtained on analysis of a sample by 106.5.

The critical limits for maximum activity are about 75 to 90 percent release of $NH_2$—N and in any event hydrolysis should be carried out until not less than 70 percent or more than 95 percent of the $NH_2$-nitrogen obtainable on complete acid hydrolysis is liberated. To make preparations which fall within these limits there are at least four variables which must be considered. These are: (a) acid concentration, (b) thyroactive iodinated protein concentration, (c) time and (d) temperature. To change any one of these variables will necessitate a change in at least one of the other variables if the batch is to fall within the critical limits. We have derived a rate equation which defines the conditions (a), (b) and (c) for any given temperature. In addition, we have determined that the rate of the reaction is doubled by each increase in temperature of 10° C. By applying the rate equation to any set of three conditions (not necessarily critical limits) the other condition which will yield a potent product can then be determined.

Expressed in different manner, the critical conditions are those which will yield a product in which the potential amino acids of the precursor are about 75 to 90 percent converted to free amino acid form. The reaction conditions for such a conversion are given by the following equations:
Rate of reaction at 122° C. = K = 0.001 × % $H_2SO_4$ − 0.004 × % Prot. A 10° C. increase in temperature doubles the rate of reaction. $1/C = KT + B$
C = Concentration of unreacted amino acid nitrogen at time T.
K = Rate constant
B = Amount of reaction which takes place in heating the mixture to temperature and in cooling to room temperature. This value is a function of the equipment used and we call it the equipment constant. It must be determined for any particular reaction vessel and for the equipment illustrated below it is 0.01.

The reaction can be carried out with a wide variety of materials under widely varying conditions, the only concern being the selection of the related parameters to assure that the degree of reaction is within the critical range. The source of thyroactive iodinated protein is preferably "Protamone," a commercial iodinated casein produced by the process of Graham, Kohler and Hoover, U.S. Pat. No. 2,650,914. The method is equally applicable to vegetable proteins and animal proteins such as iodinated soy bean protein or iodinated blood serum protein. Reference is made to United States Patents to Turner et al. — Re.23,429; West et al. — 2,642,426; and Van Bruggen et al. — 2,709,671. The thyroactive iodinated casein that is to be treated can vary in concentration of from 5 to 60 percent by weight and the weight ratio of acid to protein can vary from 3 to 1 to 20 to 1. Though the preferred mineral acid is sulfuric in a concentration of 2.5 to 30 percent, other acids such as hydrochloric, hydroiodic or a mixture of $H_2SO_4$ and KI can also be utilized. The time and temperature selected are governed partly by concentration of acid and thyroactive iodinated protein and also by the desired speed of reaction and ease of control to maintain the conditions within the critical range. Temperatures from 100° to 165° C. are suitable at reaction periods of from 5 minutes to 12 hours, but temperatures of 120° to 155° C. are preferred for the reasons discussed above. Hydrolysis is stopped within the critical range by cooling and/or neutralization.

A suitable general procedure for the inventive process involves charging the thyroactive iodinated protein into an acid resistant externally heated pressure vessel equipped with agitator. The vessel is heated and air is preferably exhausted before the acid is added to the vessel. The acid is added by means of a pressure injector. The temperature is adjusted by the external heating means and the mixture is held at this temperature with or without agitation for various periods of time in order to obtain samples differing in free amino nitrogen ($NH_2$—N) and in biological activity. The reaction mixture is then cooled to room temperature at the desired stage of reaction and neutralized with alkali such as ammonia, sodium hydroxide or potassium hydroxide while cooling is continued. The mixture can be utilized as is or can be further processed.

The thyroxine fraction can be precipitated by acidifying the mixture to pH 1 to 8, preferably to pH 3 to 4 and the precipitate filtered. The moist precipitate can be mixed with a feedstuff absorbent character, e.g., bran, ground corn cobs, grain, etc. and the mixture dried or the moist precipitate can be dried directly in a forced draft oven for several hours and is suitable for feeding as is or mixed with other feedstuffs.

During the acid treatment various amino acids such as lysine, glutamic acid and diiodotyrosine, potentially present in the original thyroactive iodinated protein are also liberated. When the thyroxine containing fraction is precipitated and separated, these amino acids remain soluble in the filtrate and can be recovered as valuable by-products, thus adding commercial value to the method.

When the acid soluble amino acids are separated from the thyroxine fraction, the latter will contain a higher percentage of thyroxine on a solids basis than the original thyroactive iodinated protein. About 25–30 percent of the original weight of thyroactive iodinated casein is recovered in the acid insoluble fraction and this dried acid insoluble product contains 1.5 to 3 percent of chemically determinable l. thyroxine.

As an alternative to adding alkali to the reaction mixture and its subsequent reacidification, the acidic mixture may only have added to it sufficient alkaline reagent to bring the pH within the range of 1 to 8 preferably 3 to 4. The resultant mixture which contains the thyroxine fraction and acid soluble amino acids can also in this case be dried directly or dried in the presence of feedstuff to yield a useful high potency product in either case.

The following example is illustrative of a detailed specific procedure that can be followed in the practice of the invention:

EXAMPLE I 6.6 gals. of water were placed in a 30-gal. Pfaudler glass-lined agitated kettle. Steam was admitted to the kettle jacket to bring the water to a boil. 22 lbs. of thyroactive iodinated casein (Protamone) were added and the lid was closed and sealed. Jacket steam was again turned on to bring the temperature in the kettle to 107° C. Meanwhile, the entrapped air was bled off through a valve. With the agitator going, 25.2 lbs. of 66° Be. sulphuric acid was added by means of a pressure injector as rapidly as possible (about 30 seconds). The temperature was brought to 153° C. by a combination of steam in the jacket and heat of solution of the sulphuric acid. The reaction mixture was held at this temperature for 13 minutes. The steam was then turned off and the mixture cooled by introducing first warm and then cold water into the kettle jacket. About 20 minutes were required to cool the mixture to 55° C. There was then added 6 gals. of 28 per cent ammonia and the mixture stirred for thirty minutes. The thyroxine fraction was precipitated by acidifying the mixture to pH 3 and filtering. The precipitate thus obtained was dried in a forced draft oven at 80° C. for several hours to yield a product which could readily be administered to animals, poultry or humans. This dried product was assayed for biological potency using the thiouracilized chick.

The above procedure was generally followed except the acid iodinated casein time concentrations and temperature were varied to produce the results reported in the following table.

TABLE

| Experiment | Reagent | Reagent, iodinated casein | Time (hrs.) | Temp. (° C.) | Free NH$_2$-nitrogen, mg./gm. | Chick assay (control) | 1. Thyroxine, percent (acid treated) |
|---|---|---|---|---|---|---|---|
| 2 | 10% H$_2$SO$_4$ | 20:1 | 4 | 120 | 83 | 0.205 | 0.386 |
| 3 | 10% H$_2$SO$_4$ + 5% KI | 20:1 | 4 | 120 | 83 | 0.205 | 0.378 |
| 4 | 10% H$_2$SO$_4$ | 20:1 | 1/2 | 153 | 83 | 0.169 | 0.301 |
| 5 | 10% H$_2$SO$_4$ | 20:1 | 1 | 153 | 90 | 0.169 | 0.418 |
| 6 | 30% H$_2$SO$_4$ | 3:1 | 0.1 | 153 | 66.7 | 0.228 | 0.264 |
| 7 | 30% H$_2$SO$_4$ | 3:1 | 0.2 | 153 | 82 | 0.228 | 0.479 |
| 8 | 30% H$_2$SO$_4$ | 3:1 | 0.5 | 153 | 88 | 0.228 | 0.500 |
| 9 | 30% H$_2$SO$_4$ | 20:1 | 4.0 | 110 | 76 | 0.228 | 0.308 |
| 10 | 30% H$_2$SO$_4$ | 3:1 | 0.09 | 153 | 77.3 | 0.203 | 0.444 |
| 11 | 30% H$_2$SO$_4$ | 3:1 | 0.18 | 153 | 87.2 | 0.203 | 0.505 |
| 12 | 30% H$_2$SO$_4$ | 3:1 | 0.18 | 153 | 89.4 | 0.203 | 0.570 |
| 13 | 30% H$_2$SO$_4$ | 3:1 | 0.27 | 153 | 93.6 | 0.203 | 0.474 |
| 14 | 30% H$_2$SO$_4$ | 3:1 | 0.36 | 153 | 99.05 | 0.203 | 0.460 |
| 15 | 30% H$_2$SO$_4$ | 3:1 | 0.22 | 153 | 89 | 0.203 | 0.532 |
| 16 | 30% H$_2$SO$_4$ | 3:1 | 0.23 | 153 | 90 | 0.203 | 0.564 |
| 17 | 30% H$_2$SO$_4$ | 3:1 | 0.03 | 153 | 64 | 0.225 | 0.181 |
| 18 | 30% H$_2$SO$_4$ | 3:1 | 0.08 | 153 | 75 | 0.225 | 0.392 |
| 19 | 30% H$_2$SO$_4$ | 3:1 | 0.13 | 153 | 83 | 0.225 | 0.365 |
| 20 | 30% H$_2$SO$_4$ | 3:1 | 0 | 153 | 67.1 | 0.28 | 0.212 |

The control figure was obtained from the untreated samples. The assay procedure is valuable in being a relative measure between prior art preparations and those of the present invention. The particular bioassay procedure utilized to determine the potencies of the final products of the present invention involves feeding day-old female chicks housed in a modified Oakes battery in a 25° C. air-conditioned room on a basal ration containing 0.1 percent methyl thiouracil. The primary requirement of the ration is that it be a well balanced ration which permits high viability. After one week on this ration, all groups receive a ration containing 0.00001% dl. thyroxine and appropriate levels (in a linear array) of a 4 mg. per ml. solution of treated or untreated thyroactive protein.

At the age of 22 days each chick is weighed, sacrificed and the thyroid glands are removed. After elimination of fat and connective tissue, the glands are weighed on a Roller-Smith Precision Balance (dial range 50 mg.) to the nearest 0.01 mg. During processing the glands are kept moist with physiological saline solution. Prior to being weighed, the thyroids are rolled on filter paper to remove excess moisture. Each chick is dissected to verify sex and all data from cockerels are discarded.

It should be understood that the foregoing disclosure relates only to preferred embodiments of the invention and that numerous modifications or alterations may be made therein without departing from the scope of the present invention, as set forth in the appended claims.

We claim:
1. A process for preparing a thyroxine-containing product of enhanced biological activity from synthetic thyroprotein, comprising: hydrolyzing a thyroactive iodinated protein selected from the group consisting of iodinated casein and iodinated vegetable protein with sulfuric acid in a non-alcoholic aqueous medium at a temperature of 100° to 165° C until not less than 70 percent and not more than 95 percent of the NH$_2$-nitrogen obtainable on complete acid hydrolysis is liberated, stopping the hydrolysis in said critical range, and recovering the resulting thyroxine-containing material.

2. The process of claim 1 in which not less than 75 percent and not more than 90 percent of the potential NH$_2$-nitrogen is liberated when the reaction is stopped.

3. The process of claim 1 in which an aqueous mixture of 10 to 30 percent sulfuric acid and 10 to 33 percent of thyroactive iodinated casein in an acid to casein ratio of 3:1 to 20:1 is heated for a period of 15 minutes to 4 hours at a temperature of 120° to 155° C until hydrolysis is within said critical hydrolysis range.

4. The process of claim 1 in which the reaction mass is cooled when hydrolysis is within said critical range and sufficient alkaline reagent is added to bring the pH to about 3 to 4 and the resulting mass is dried.

5. The process of claim 1 in which the reaction mass is cooled when hydrolysis is within said critical range, the reaction mass is neutralized, the thyroactive compounds are precipitated from the neutralized mixture by reacidifying to pH 3 to 4, and the precipitate is recovered.

6. The process of claim 4 wherein the alkaline reagent is ammonia.

7. The process of claim 4 wherein after adjusting the pH to about 3 to 4, the resulting wet mixture is mixed with a feedstuff having absorbent character.

8. The process of claim 1 wherein the thyroactive iodinated protein is iodinated soy bean protein.

* * * * *